May 12, 1925.

J. S. REID

SAWMILL CARRIAGE

Filed Nov. 9, 1922

1,537,880

Inventor
Joseph S. Reid
By Vernan E. Hodges
His Attorney

Patented May 12, 1925.

1,537,880

UNITED STATES PATENT OFFICE.

JOSEPH S. REID, OF OLEAN, NEW YORK, ASSIGNOR TO CLARK BROTHERS COMPANY, OF OLEAN, NEW YORK, A CORPORATION OF NEW YORK.

SAWMILL CARRIAGE.

Application filed November 9, 1922. Serial No. 599,854.

*To all whom it may concern:*

Be it known that I, JOSEPH S. REID, a citizen of the United States, residing at Olean, in the county of Cattaraugus and State of New York, have invented certain new and useful Improvements in Sawmill Carriages, of which the following is a specification.

This invention relates to saw mill carriages, more particularly to the means for feeding the knees transversely of the carriage, the object of the invention being to arrange a take-up bearing for the feed screw to compensate for the wear between this bearing and the collar of the feed screw, and between the pinion keyed to the feed screw.

In sawmills where very large logs are sawn, the log sawing carriage is usually of the screw block type, that is, the knees of the carriage are moved in and out by long screws, each screw located inside its knee base, and all the screws are rotated in one direction to advance the knees, and in the other direction to recede the knees, by a long shaft lengthwise and at the rear of the carriage, each knee screw being connected to this long shaft by gears usually mitre gears and this long shaft, called a set shaft, is rotated, as desired, by a suitable mechanism called a set works.

The push of the knee screw, when the knee and the heavy log are advanced and the pull of the knee screw when the knees are receded, are withstood by a bearing in the knee base usually at the rear end of the knee screw, between a thrust collar on the knee screw and the hub of the gears on the end of the knee screw. Wear soon develops at the ends of this bearing, the gears in consequence not running in correct mesh with one another, and what is more important the knee and the log attached to it are not held precisely, thus the sawing is inaccurate. It being troublesome to renew this bearing, the looseness from continual wear is permitted to increase until the resulting inaccurate sawing is too serious to be longer tolerated.

Figure 1:
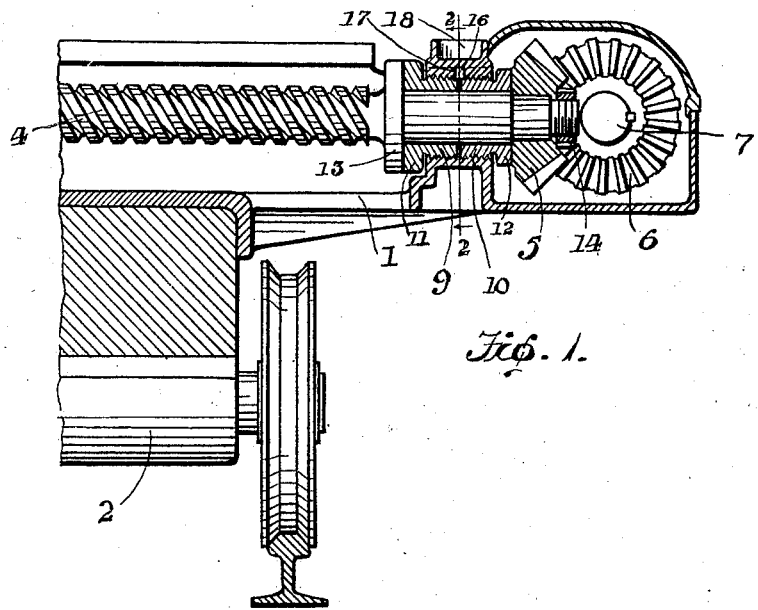
Figure 2:
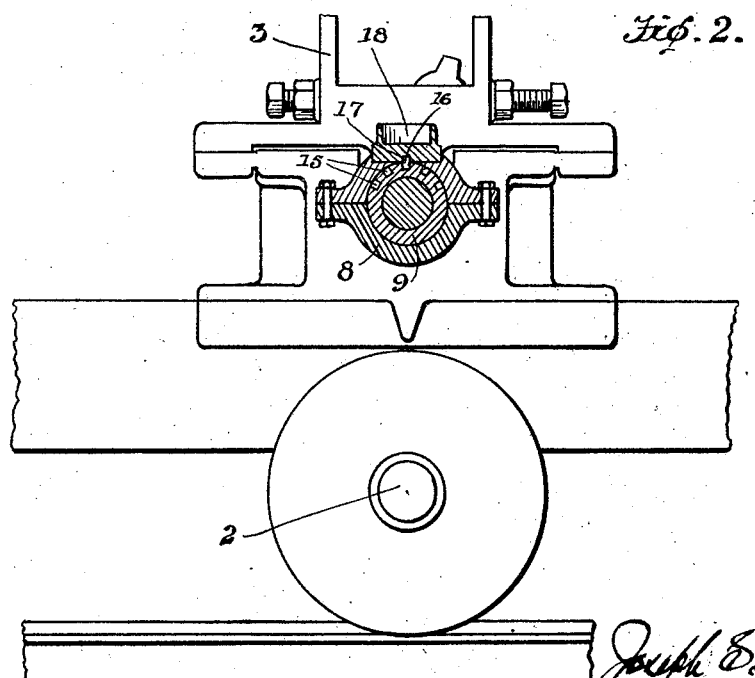

In the accompanying drawings:

Figure 1 is a partial transverse sectional view through the sawmill carriage; and Fig. 2 is a section on line 2—2 of Fig. 1.

The numeral 1 indicates the carriage mounted upon suitable trucks 2. Arranged to travel transversely of the carriage is a knee 3, adapted to be actuated by a feed screw 4. The outer end of the feed screw 4 is provided with a pinion 5 adapted to mesh with a pinion 6 keyed to the drive-shaft 7 extending lengthwise of the machine and geared with the actuating mechanism of the several knees.

To take up the endwise wear and to maintain the bevel gears 5 and 6 in correct mesh, I preferably arrange in the bearing 8, which supports the outer end of the screw 4, two sleeve nuts 9 and 10 which have screw threaded engagement with the bearing 8. Each of these nuts is provided at its outer ends with collars 11 and 12, the collar 11 abutting against a collar 13 on the feed screw and the collar 12 abutting against the hub of the pinion 5, the latter being held on the feed screw 4 by means of a nut 14. These sleeve nuts 9 and 10 are provided with a plurality of radial slots 15 adapted to receive a key 16 arranged in a slot 17 on the under side of a cap 18 secured to the upper side of the bearing 8.

If the forward sleeve nut 10 is rotated in the proper direction, the wear between it and the hub of the gear 5 carried by the feed screw 4 is taken up forcing the pinion 5 into mesh with the pinion 6, likewise the rotation of the rear sleeve nut 9 will take up the wear between it and the collar 13 of the feed screw, in this manner compensating for any wear of the several parts. After adjustment, the sleeve nuts 9 and 10 are each locked by bringing into alignment the radial slots 15, when the key 16 is placed in position and held in place by the cap 18, which is secured to the bearing 8. The collars of the sleeve nuts 9 and 10 are preferably squared to accommodate a spanner wrench by which they are adjusted.

It is obvious that more or less slight change might be made in the details of construction without departing from the general scope of my invention.

I claim:

1. The combination of a base, a bearing, rotatable nuts adapted to be moved longitudinally of the bearing when rotated, a shaft received in the nuts, said nuts having complementary radial notches therein, and means adapted to be received in the notches for holding the nuts together in their adjusted position.

2. The combination of a base, a bearing, rotatable sleeve nuts having screw-threaded engagement with the bearing, said nuts having complementary radial notches arranged in the periphery thereof, a removable cap connected with the nuts and having a notch therein, and a key adapted to be received in the notches for holding the nuts together in their adjusted position.

3. The combination of a base, a bearing, rotatable sleeve nuts having screw-threaded engagement with the bearing, said nuts having radial notches in the periphery thereof, a removable cap connected with the nuts and having a notch therein, a key adapted to be received in the notches, a shaft journaled in the nuts having a collar thereon, a gear sleeved to the end of the shaft, each of the nuts having a collar on the outer end, one of said collars being in position to engage the collar on the shaft and the other collar in position to engage the gear for taking up wear in two directions.

4. The combination of a base, a bearing, a feed screw journaled in said bearing and provided with a collar spaced from said bearing on one side and a pinion spaced from said bearing on the opposite side and rotatable sleeve nuts having screw threaded engagement with said bearing and arranged between said collar and pinion, said rotatable sleeve nuts adapted to move independently longitudinally of said feed screw when rotated, and means for locking said rotatable sleeve nuts against rotation.

In testimony whereof I affix my signature.

JOSEPH S. REID.